United States Patent
Olsen et al.

(10) Patent No.: US 10,578,307 B2
(45) Date of Patent: Mar. 3, 2020

(54) SYSTEM AND METHOD FOR OPERATING A GAS TURBINE ASSEMBLY INCLUDING HEATING A REACTION/OXIDATION CHAMBER

(71) Applicant: Dresser-Rand Company, Olean, NY (US)

(72) Inventors: Andrew J. Olsen, Amesbury, MA (US); George C. Talabisco, Olean, NY (US); Scott David Wisler, Olean, NY (US); Silvano R. Saretto, Snoqualmie, WA (US)

(73) Assignee: DRESSER-RAND COMPANY, Olean, NY (US)

( * ) Notice: Subject to any disclaimer, the term of this patent is extended or adjusted under 35 U.S.C. 154(b) by 538 days.

(21) Appl. No.: 15/250,997

(22) Filed: Aug. 30, 2016

(65) Prior Publication Data

US 2017/0102148 A1 Apr. 13, 2017

Related U.S. Application Data

(60) Provisional application No. 62/239,360, filed on Oct. 9, 2015.

(51) Int. Cl.
*F23R 3/40* (2006.01)
*F02C 7/08* (2006.01)
(Continued)

(52) U.S. Cl.
CPC ............... *F23R 3/42* (2013.01); *F01D 15/10* (2013.01); *F02C 3/04* (2013.01); *F23R 3/40* (2013.01); *H02K 7/1823* (2013.01); *F02C 6/08* (2013.01); *F02C 7/08* (2013.01); *F02C 7/224* (2013.01); *F05D 2220/32* (2013.01); *F05D 2240/35* (2013.01)

(58) Field of Classification Search
CPC .... F02C 7/224; F02C 7/08; F02C 6/08; F23K 2301/204; F23N 2021/04; F23N 2021/06; F23R 3/40
See application file for complete search history.

(56) References Cited

U.S. PATENT DOCUMENTS

| 4,754,607 A | * | 7/1988 | Mackay | F02C 6/18 237/12.1 |
| 5,392,595 A | * | 2/1995 | Glickstein | F02C 6/18 60/39.12 |

(Continued)

*Primary Examiner* — William H Rodriguez

(57) ABSTRACT

A gas turbine assembly and method for operating the gas turbine assembly are provided. The method for operating the gas turbine assembly may include compressing a process fluid containing inlet air through a compressor to produce compressed inlet air, combining fuel from a main fuel source with the process fluid, and preheating the process fluid containing the inlet air and the fuel in a warmer disposed downstream from the compressor. The method may also include heating an oxidizer by flowing the preheated process fluid from the warmer to the oxidizer, and oxidizing the process fluid containing the compressed inlet air and the fuel in the oxidizer to produce an oxidation product. The method may further include expanding the oxidation product in a turbine to generate rotational energy, and preventing the process fluid from flowing upstream to the compressor with a check valve.

10 Claims, 3 Drawing Sheets

(51) Int. Cl.
*F02C 7/224* (2006.01)
*F02C 6/08* (2006.01)
*F23R 3/42* (2006.01)
*F02C 3/04* (2006.01)
*F01D 15/10* (2006.01)
*H02K 7/18* (2006.01)

(56) References Cited

U.S. PATENT DOCUMENTS

| | | | | |
|---|---|---|---|---|
| 5,729,967 A | * | 3/1998 | Joos | F02C 3/28 60/39.12 |
| 5,937,632 A | * | 8/1999 | Dobbeling | F02C 3/20 60/39.12 |
| 6,205,768 B1 | * | 3/2001 | Dibble | F02C 7/08 60/39.511 |
| 6,269,625 B1 | * | 8/2001 | Dibble | F02C 3/20 60/39.12 |
| 7,003,961 B2 | | 2/2006 | Kendrick et al. | |
| 8,371,101 B2 | | 2/2013 | Zuo et al. | |
| 8,726,666 B2 | | 5/2014 | Kendrick | |
| 9,140,455 B2 | | 9/2015 | Stoia et al. | |
| 2002/0139119 A1 | * | 10/2002 | Touchton | F02C 3/34 60/772 |
| 2005/0022499 A1 | * | 2/2005 | Belokon | F23C 9/00 60/39.511 |
| 2006/0080967 A1 | * | 4/2006 | Colket, III | F23C 6/045 60/777 |
| 2006/0156735 A1 | * | 7/2006 | Laster | F23C 13/04 60/777 |
| 2010/0275611 A1 | * | 11/2010 | Prabhu | F02C 7/222 60/780 |
| 2010/0319355 A1 | * | 12/2010 | Prabhu | F02C 7/224 60/772 |
| 2010/0319359 A1 | * | 12/2010 | Holt | F02C 6/08 60/782 |
| 2014/0245749 A1 | * | 9/2014 | Mercier | F02C 7/047 60/785 |
| 2017/0009653 A1 | * | 1/2017 | Zheng | F02C 7/047 |

\* cited by examiner

United States Patent 10,578,307 B2

SYSTEM AND METHOD FOR OPERATING A GAS TURBINE ASSEMBLY INCLUDING HEATING A REACTION/OXIDATION CHAMBER

CROSS REFERENCE TO RELATED APPLICATIONS

This application claims priority to U.S. Provisional Patent Application having Ser. No. 62/239,360, which was filed Oct. 9, 2015. The aforementioned patent application is hereby incorporated by reference in its entirety into the present application to the extent consistent with the present application.

BACKGROUND

Reliable and efficient gas turbines have been developed and are utilized in a myriad of industrial processes to drive process equipment (e.g., compressors, pumps, etc.) or generators to thereby provide a local source of mechanical power or electricity. To drive the process equipment and the generators, conventional gas turbines may receive and compress air (e.g., ambient air) in a compressor, combust the compressed air with fuel in a combustor to increase the thermal energy thereof, and expand the combusted air through a turbine to convert the thermal energy to kinetic or mechanical energy. While conventional gas turbines have proven to be reliable for driving the process equipment and the generators, the combustion of the fuel in the combustor generates undesirable compounds (e.g., carbon monoxide, NOx, etc.), which are then vented or exhausted to the atmosphere.

In view of the foregoing, conventional gas turbines may often utilize an alternative source of thermal energy (e.g., an oxidizer), in lieu of the combustor, to gradually oxidize a mixture of the compressed air and the fuel to increase the thermal energy and drive the gas turbines. The oxidizer may reduce the generation of the undesirable compounds by heating a mixture of the fuel and the compressed air to a temperature sufficient to convert the mixture to carbon dioxide and water while maintaining the temperature below a temperature at which the undesirable compounds may be generated. While utilizing the oxidizer may reduce the generation of the undesirable compounds in the exhaust of the gas turbine, the amount of heat or thermal energy generated in the oxidizers may often be released therefrom for an extended period of time, which may be detrimental to the gas turbine and/or components thereof during one or more modes of operation. For example, during a temporary shutdown of the gas turbine (e.g., maintenance, repair, surge event, etc.) the release of the thermal energy from the oxidizer may result in damage to the gas turbine and/or components thereof.

What is needed, then, is an improved gas turbine assembly and method for operating the gas turbine assembly.

SUMMARY

Embodiments of the disclosure may provide a method for operating a gas turbine assembly. The method may include compressing a process fluid containing inlet air through a compressor to produce compressed inlet air. The method may also include combining fuel from a main fuel source with the process fluid, and preheating the process fluid containing the inlet air and the fuel in a warmer disposed downstream from the compressor. The method may further include heating an oxidizer by flowing the preheated process fluid from the warmer to the oxidizer, and oxidizing the process fluid containing the compressed inlet air and the fuel in the oxidizer to produce an oxidation product. The method may also include expanding the oxidation product in a turbine to generate rotational energy, and preventing the process fluid from flowing upstream to the compressor with a check valve.

Embodiments of the disclosure may also provide another method for operating a gas turbine assembly. The method may include operating the gas turbine assembly in a startup mode of operation and a steady state mode of operation. Operating the gas turbine assembly in the startup mode of operation may include compressing a process fluid containing inlet air through a compressor to produce compressed inlet air, preheating the process fluid containing the compressed inlet air in a warmer disposed downstream from the compressor, and preheating an oxidizer to an auto-ignition temperature of the process fluid by flowing the preheated process fluid from the warmer to the oxidizer. Operating the gas turbine assembly in the steady state mode of operation may include ceasing the preheating of the process fluid in the warmer and flowing fuel from a main fuel source to a fuel injection point to combine the fuel with the process fluid. Operating the gas turbine assembly in the steady state mode of operation may also include oxidizing the process fluid containing the compressed inlet air and the fuel in the oxidizer to produce an oxidation product, and expanding the oxidation product in a turbine to generate rotational energy. The method for operating the gas turbine assembly may also include actuating a check valve in response to a failure event to prevent the process fluid from flowing upstream to the compressor.

Embodiments of the disclosure may further provide a gas turbine assembly. The gas turbine assembly may include a compressor, a warmer fluidly coupled with and disposed downstream from the compressor, and an oxidizer fluidly coupled with and disposed downstream from the warmer. The compressor may be configured to receive and compress inlet air to produce compressed inlet air, the warmer may be configured to receive and preheat the compressed inlet air from the compressor and a fuel from a main fuel source, and the oxidizer may be configured to oxidize the compressed inlet air and the fuel in a flameless oxidation process to produce an oxidation product. The gas turbine assembly may also include a turbine fluidly coupled with and disposed downstream from the oxidizer, and a generator operatively coupled with the turbine. The turbine may be configured to receive and expand the oxidation product from the oxidizer to generate rotational energy, and the generator may be configured to convert the rotational energy to electrical energy. The gas turbine assembly may further include a check valve fluidly coupled with and disposed between the compressor and the warmer. The check valve may be configured to prevent the oxidation product from flowing to the compressor.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
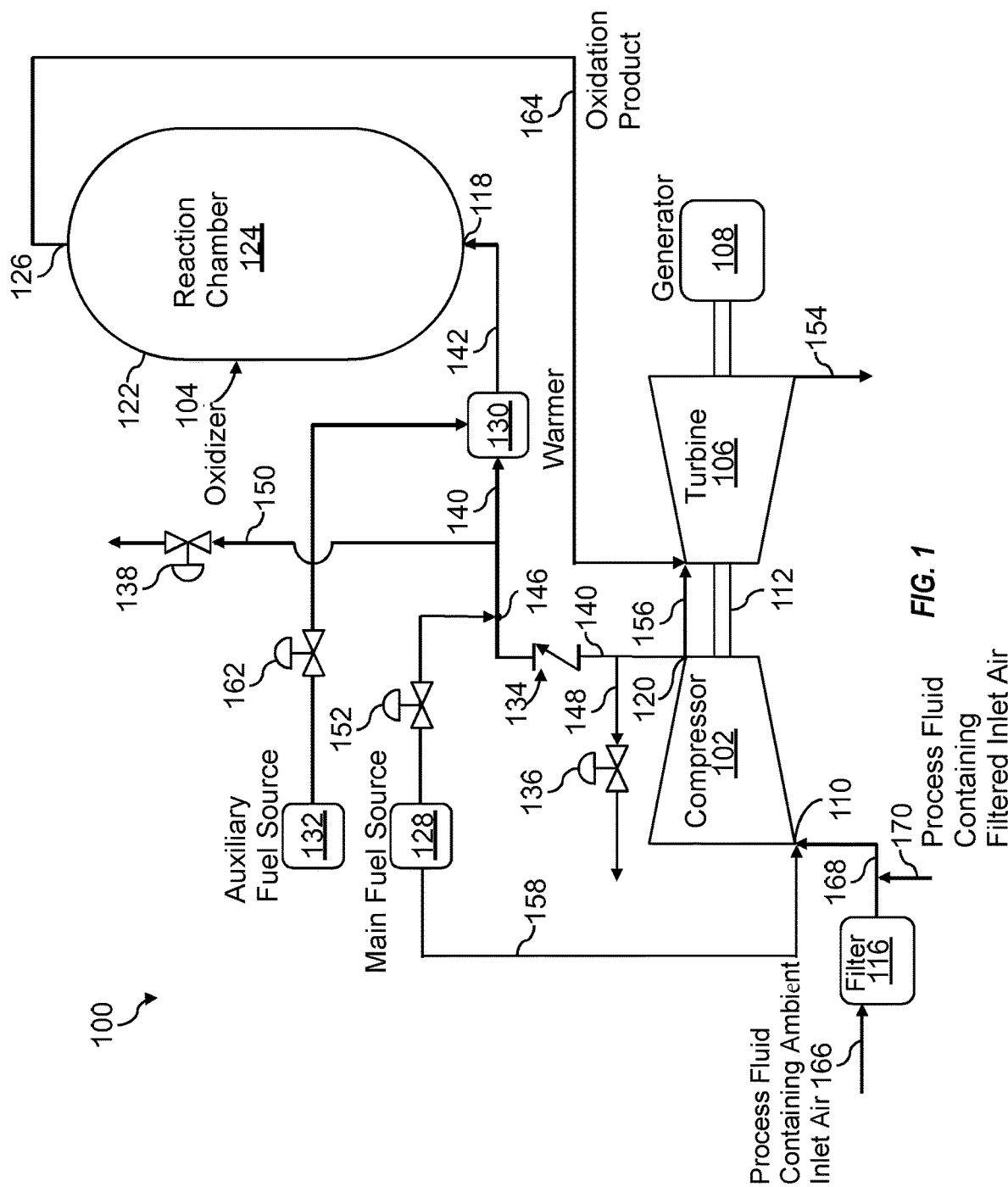
FIG. 1 illustrates a schematic view of an exemplary gas turbine assembly, according to one or more embodiments disclosed.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Further, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

FIG. 1 illustrates a schematic view of an exemplary gas turbine assembly 100, according to one or more embodiments. As illustrated in FIG. 1, the gas turbine assembly 100 may include a compressor 102, an oxidizer 104 fluidly coupled with and disposed downstream from the compressor 102, a turbine 106 fluidly coupled with and dispose downstream from the oxidizer 104, and a generator 108 operatively coupled with the turbine 106. As further described herein, the compressor 102 may be configured to receive and compress a process fluid (e.g., inlet air, fuel, VOCs, etc.) introduced to an inlet 110 thereof, the oxidizer 104 may be configured to receive and oxidize the process fluid (e.g., compressed inlet air and the fuel) to produce an oxidation product, the turbine 106 may be configured to receive and expand the process fluid (e.g., the oxidation product) to produce mechanical or rotational motion, and the generator 108 may be configured to convert the rotational motion of the turbine 106 into electrical energy or a power output.

As illustrated in FIG. 1, the compressor 102, the turbine 106, and the generator 108 may be coupled with one another via a rotary shaft 112. The rotary shaft 112 may be a single segment or multiple segments coupled with one another via one or more gears (not shown) and/or couplings (not shown). The compressor 102 may include one or more compressor stages (not shown). For example, the compressor 102 may be a single-stage compressor or a multi-stage compressor. An illustrative compressor 102 may include, but is not limited to, a supersonic compressor, a centrifugal compressor, an axial flow compressor, a reciprocating compressor, a rotating screw compressor, a rotary vane compressor, a scroll compressor, a diaphragm compressor, a RAMPRESSOR™ or a SUPERCOMPRESSOR™, each of which may be available from Dresser-Rand of Olean, N.Y., or the like. As illustrated in FIG. 1, a filter 116 may be fluidly coupled with the inlet 110 of the compressor 102. The filter 116 may be configured to receive a process fluid containing ambient inlet air, separate one or more solid particulates from the inlet air, and direct the process fluid containing the filtered inlet air to the compressor 102.

The oxidizer 104 may be fluidly coupled with and disposed downstream from the compressor 102. For example, as illustrated in FIG. 1, an inlet 118 of the oxidizer 104 may be fluidly coupled with and disposed downstream from an outlet 120 of the compressor 102 via lines 140, 142. The oxidizer 104 may include a pressure vessel 122 defining a cavity or reaction chamber 124 therein. In at least one embodiment, a heater (not shown) may be at least partially disposed in the reaction chamber 124 and configured to increase a temperature thereof. The reaction chamber 124 of the oxidizer 104 may be at least partially filled with insulating refractory materials, heat-absorbing materials, heat-insulating materials, or the like, or any combination thereof. For example, the reaction chamber 124 of the oxidizer 104 may be at least partially filled with rocks, ceramics, and/or any other material having a high thermal mass. In another example, the reaction chamber 124 may be at least partially filled with a porous media (e.g., ceramic). The porous media may be configured to absorb and/or retain heat or thermal energy generated in the reaction chamber 124. The porous media may also be configured to provide a tortuous flowpath between the inlet 118 and an outlet 126 of the oxidizer 104. The porous media may further be configured to increase surface area in the reaction chamber 124 to increase the transfer of thermal energy or heat to the process fluid flowing therethrough. The reaction chamber 124 may also be at least partially filled with one or more catalysts configured to facilitate or promote the initiation and/or completion of an oxidation reaction. Illustrative catalysts may include, but are not limited to, platinum. As further described herein, the oxidizer 104 may be configured to receive the process fluid containing an oxidizable fuel and the compressed air via the inlet 118 thereof, maintain a flameless oxidation process in the reaction chamber 124 to produce an oxidation product, and direct the oxidation product to the turbine 106 via the outlet 126 thereof. In at least one embodiment, the oxidizer 104 may be replaced with a heat exchanger configured to indirectly transfer heat to the process fluid flowing therethrough. For example, the oxidizer 104 may be replaced with a heat exchanger configured to receive heat from an externally fired burner or any other source of thermal energy, and transfer the heat to the process fluid flowing therethrough.

The gas turbine assembly 100 may include a primary or main fuel source 128 fluidly coupled with and disposed upstream of the oxidizer 104. In at least one embodiment, the main fuel source 128 may be fluidly coupled with the inlet 110 of the compressor 102 via line 158, and the compressor 102 may be configured to compress a mixture of the fuel and the inlet air. It should be appreciated that the main fuel source 128 may also be fluidly coupled with the filter 116 and configured to deliver the fuel to the compressor 102 via the filter 116. In another embodiment, illustrated in FIG. 1, the main fuel source 128 may be fluidly coupled with line 140 at a fuel injection point 146 disposed downstream from the compressor 102 and upstream of the oxidizer 104. As further described herein, the main fuel source 128 may be configured to direct the fuel to line 140 via the fuel injection point 146 to combine or mix the fuel with the process fluid flowing therethrough, thereby providing the process fluid with a mixture of the compressed inlet air and the fuel.

The main fuel source 128 may be a natural fuel source or a human-made fuel source. The fuel from the main fuel source 128 may include a single type of fuel or multiple types of fuel, one or all of which may be oxidized in the oxidizer 104. For example, the fuel may include one or more hydrocarbon fuels and/or one or more oxidizable fuels. Illustrative hydrocarbons may include, but are not limited to, methane, ethane, propane, butanes, or the like, or any combination thereof. Illustrative oxidizable fuels, may include, but are not limited to, volatile organic compounds (VOCs) or the like. As used herein, the term "volatile organic compound (VOC)" may refer to organic compounds that will enter a gaseous phase at room temperature (e.g., between about 15° C. to about 30° C.), and/or may refer to organic compounds that combined with oxygen in an exothermic reaction. Illustrative VOCs may include, but are not limited to, acetone, acrolein, acrylonitrile, allyl alcohol, allyl chloride, benzene, butene-1, chlorobenzene, 1-2 dichloroethane, ethane, ethanol, ethyl acrylate, ethylene, ethyl formate, ethyl mercaptan, methane, methyl chloride, methyl ethyl ketone, propane, propylene, toluene, triethylamine, vinyl acetate, vinyl chloride, or the like, or any combination thereof.

In at least one embodiment, the fuel from the main fuel source 128 may be or include a low-energy content fuel. For example, the low-energy content fuel may have a concentration of a hydrocarbon (e.g., methane) less than 50%, less than 25%, less than 15%, less than 10%, less than 5%, or less than 2%. The fuel from the main fuel source 128 may also be or include a weak fuel or a fuel containing low BTU gases. As used herein, the term "weak fuel" may refer to gases that have a fuel concentration below the concentration that may sustain an open flame and/or any other combustion reaction. The weak fuels may also include, but are not limited to, gases having a fuel concentration below a lower explosive limit (LEL) and/or lower flammability limit (LFL) of the fuel. As used herein, the terms "lower explosive limit (LEL)" and/or "lower flammability limit (LFL)" may refer to the lowest concentration of the fuel in air capable of producing a flash or fire in the presence of an ignition source.

As illustrated in FIG. 1, the gas turbine assembly 100 may include a warmer 130 fluidly coupled between line 140 and line 142. As further illustrated in FIG. 1, the warmer 130 may be disposed upstream of the oxidizer 104 and downstream from the fuel injection point 146. The warmer 130 may be configured to selectively heat or preheat the process fluid containing the compressed inlet air and/or a fuel, and direct the preheated process fluid to the inlet 118 of the oxidizer 104 to thereby increase the temperature of the oxidizer 104 and the reaction chamber 124 thereof. In at least one embodiment, the warmer 130 may be an electric heater, a combustor, or any other device capable of generating heat. For example, as illustrated in FIG. 1, the warmer 130 may be a burner configured to generate heat from the combustion of a fuel from an auxiliary fuel source 132. As further illustrated in FIG. 1, the warmer 130 may receive the fuel from the auxiliary fuel source 132 via line 160 and control valve 162. In another embodiment, the warmer 130 may be a heat exchanger or a recuperator configured to receive a heated working fluid (e.g., an exhaust) and transfer the heat (e.g., waste heat) from the working fluid to the compressed inlet air and/or the fuel. For example, the warmer 130 may be a heat exchanger configured to receive an exhaust from the turbine 106, transfer heat from the exhaust to the process fluid containing the compressed inlet air and/or the fuel, and direct the heated process fluid to the inlet 118 of the oxidizer 104. In yet another embodiment, the gas turbine assembly 100 may include the warmer 130 and a separate heat exchanger or recuperator (not shown). The separate heat exchanger or recuperator may be fluidly coupled with line 140 or line 142, and may be disposed between the compressor 102 and the oxidizer 104. The separate heat exchanger may be configured to receive the exhaust from the turbine 106 and the process fluid from the compressor 102, transfer heat from the exhaust to the process fluid, and direct the heated process fluid to the oxidizer 104. It should be appreciated that the separate heat exchanger may be configured to utilize waste heat exhausted from the turbine 106 to increase or maintain the temperature of the oxidizer 104 during one or more modes of operating the gas turbine assembly 100. For example, the separate heat exchanger may maintain the temperature of the oxidizer 104 during a steady-state mode of operation.

The gas turbine assembly 100 may include one or more valves (three are indicated 134, 136, 138) fluidly coupled with lines 140, 148, 150, respectively, and configured to control a flow of a process fluid through the respective lines 140, 148, 150. Each of the one or more valves 134, 136, 138 may be a check valve, a bleed valve, a blow-off valve, or a control valve. As further described herein, any one or more of the valves 134, 136, 138 may be configured to protect one or more components of the gas turbine assembly 100 during one or more modes of operation.

In an exemplary embodiment, a first valve 134 is a check valve configured to be passively actuated when a pressure differential across the check valve meets or exceeds a minimum or threshold differential pressure. As used herein, the term "threshold differential pressure" may refer to a pressure differential between an inlet and an outlet of a valve that is sufficient to actuate the valve to a closed or an opened position. While the first valve 134 is described herein as a check valve 134, it should be appreciated that the first valve 134 may alternatively be a control valve configured to be actively actuated between the opened position and the closed position. As illustrated in FIG. 1, the check valve 134 may be fluidly coupled with line 140 between the compressor 102 and the oxidizer 104, and configured to control a flow of the process fluid flowing therethrough. For example, the check valve 134 may be configured to prevent or reduce a flow of the process fluid upstream from the oxidizer 104 to the compressor 102. As further illustrated in FIG. 1, the check valve 134 may be disposed upstream of the warmer 130 and/or the fuel injection point 146. Accordingly, the check valve 134 may also be configured to prevent or reduce a flow of the fuel (e.g., burnt and/or un-burnt fuel) from the fuel injection point 146 to the compressor 102 during one or more modes of operation.

As illustrated in FIG. 1, a second valve 136 may be fluidly coupled with line 148. In an exemplary embodiment, the second valve 136 is a bleed valve, and line 148 is a bleed line fluidly coupled with line 140 between the compressor 102 and the check valve 134. The bleed valve 136 may be configured to control or adjust a pressure ratio of the gas turbine assembly 100 during one or more modes of operation. As further illustrated in FIG. 1, a third valve 138 may be fluidly coupled with line 150. In an exemplary embodiment, the third valve 138 is a blow-off valve, and line 150 is a blow-off line fluidly coupled with line 140 between the check valve 134 and the warmer 130. In another embodiment, the blow-off line 150 may be fluidly coupled with line 142 between the warmer 130 and the oxidizer 104. In yet another embodiment, the blow-off line 150 may be fluidly coupled with line 164 between the oxidizer 104 and the turbine 106.

The gas turbine assembly 100 described herein may provide methods for selectively operating the gas turbine assembly in one or more modes of operation. Further, as previously discussed, any one or more of the valves 134, 136, 138 may be utilized to protect or prevent damage to the gas turbine assembly 100 and/or one or more components thereof during the one or more modes of operation. The one or more modes of operation may include, but are not limited to, a start-up mode, a shutdown mode, a failure event mode (e.g., surge), an emergency shutdown mode, a steady state or normal mode, or the like.

During the start-up mode of operation, the compressor 102 and the turbine 106 may be driven from a resting state to a steady state. For example, a driver or an external starter may drive the compressor 102 from rest to at least 20%, at least 30%, at least 40%, at least 50%, at least 60%, at least 70%, at least 80%, at least 90%, or at least 95% of its maximum speed. As the compressor 102 is started, the filter 116 may receive a process fluid containing ambient inlet air via line 166, separate one or more solid particulates from the inlet air, and direct the process fluid containing the filtered inlet air to the compressor 102 via line 168. The compressor 102 may receive the process fluid containing the filtered inlet air, compress the inlet air, and direct the process fluid containing the compressed inlet air to line 140 via the outlet 120 thereof.

During the start-up mode of operation, the check valve 134 may be in a closed position. For example, the pressure at the outlet 120 of the compressor 102 may not be greater than the threshold differential pressure sufficient to actuate the check valve 134 from the closed position to the opened position. Preventing the process fluid from flowing through the check valve 134 during the start-up mode of operation may cause the compressor 102 to stall. For example, preventing the process fluid from flowing through the check valve 134 may result in a build-up of backpressure upstream of the check valve 134 that may cause the compressor 102 to stall. Accordingly, in an exemplary embodiment, the bleed valve 136 may be actuated from the closed position to the opened position before or during the start-up mode of operation to relieve or exhaust at least a portion of the backpressure upstream of the check valve 134, thereby preventing the compressor 102 from stalling. As the pressure of the process fluid at the outlet 120 of the compressor 102 and/or upstream of the check valve 134 exceeds the threshold differential pressure of the check valve 134, the bleed valve 136 may be actuated from the opened position to the closed position to activate or enable the check valve 134. For example, actuating the bleed valve 136 to the closed position may cause the pressure of the process fluid upstream of the check valve 134 to actuate the check valve 134 from the closed position to the opened position, thereby activating or enabling the check valve 134. Activating or enabling the check valve 134 may allow the check valve 134 to close automatically in response to the upstream flow of the process fluid from the oxidizer 104 toward the compressor 102. Activating the check valve 134 may also allow the process fluid containing the compressed inlet air to flow therethrough from the compressor 102 toward the oxidizer 104.

As illustrated in FIG. 1, the process fluid containing the compressed inlet air may flow through the check valve 134 toward the fuel injection point 146 and the warmer 130. In at least one embodiment, the process fluid containing the compressed inlet air may be combined or mixed with the fuel from the main fuel source 128 at the fuel injection point 146. For example, a main fuel valve 152 may be actuated to an opened position to allow a flow of the fuel from the main fuel source 128 to the fuel injection point 146. In another embodiment, the process fluid containing the compressed inlet air may not receive fuel from the main fuel source 128 during the start-up mode of operation. For example, the fuel may be provided by the auxiliary fuel source 132 via the warmer 130.

As further illustrated in FIG. 1, during the start-up mode of operation, the process fluid from the fuel injection point 146 may be directed to the warmer 130, and the warmer 130 may selectively heat or preheat the process fluid containing the compressed inlet air and/or the fuel. As previously discussed, the warmer 130 may be a heat exchanger configured to receive a heated working fluid (e.g., exhaust) and indirectly transfer the heat (e.g., waste heat) from the working fluid to the process fluid containing the compressed inlet air and/or the fuel. The warmer 130 may also be a burner configured to generate heat from the auxiliary fuel source 132 and directly transfer the generated heat to the process fluid. The heated or preheated process fluid from the warmer 130 may then be directed to the oxidizer 104 to increase the temperature of the oxidizer 104 such that the oxidizer 104 may sustain a flameless oxidation process. For example, the heated process fluid from the warmer 130 may increase the temperature of the oxidizer 104 to or above an auto-ignition temperature of the process fluid. In an exemplary embodiment, the oxidizer 104 may be heated to a temperature from about 700° C., about 730° C., about 760° C., about 790° C., about 815° C., or about 870° C. to about 925° C., about 980° C., about 1010° C., about 1040° C., about 1065° C., about 1090° C., about 1150° C., about 1200° C., about 1250° C., about 1300° C., about 1350° C., or greater. As the oxidizer 104 is heated to or above the auto-ignition temperature, the gas turbine assembly 100 may be operated in the steady state mode of operation, and the speed of the compressor 102 and the turbine 106 may increase toward the respective maximum speeds thereof.

Before or during the steady state mode of operation, the heating or preheating of the process fluid in the warmer 130 may be suspended or stopped. Additionally, the fuel from the fuel supply may begin or continue to provide fuel to the oxidizer 104 to continue the flameless oxidation process in the reaction chamber 124 thereof. The oxidizer 104 may oxidize the process fluid containing the mixture of the compressed inlet air and the fuel to thereby produce an oxidation product or an oxidized gas, and direct the oxidation product to the turbine 106 via the outlet 126 thereof. In at least one embodiment, a filter (not shown) may be fluidly coupled with line 164 between the oxidizer 104 and the turbine 106. The filter (not shown) may be configured to prevent one or more particulates (e.g., rocks, ceramics, etc.) originating from the oxidizer 104 from flowing to the turbine 106 by separating the solid particulates from the process fluid flowing therethrough. It should be appreciated that the filter disposed downstream from the oxidizer 104 may cause compressor surge and/or compressor stall as flow through the filter becomes encumbered or restricted by the presence of the filtered solid particulates. The turbine 106 may receive the oxidization product, expand the oxidation product to generate rotational energy to drive the generator 108 and/or the compressor 102, and exhaust the expanded oxidation product to an exhaust stack (not shown) via line 154. During the steady state mode of operation, at least a portion of the process fluid containing the compressed inlet air may be directed from the compressor 102 to the turbine 106 or a casing (not shown) thereof. For example, as illustrated in FIG. 1, at least a portion of the process fluid may be directed from the outlet 120 of the compressor 102 to the turbine 106 via cooling line 156 to cool the casing of the turbine 106 and/or the process fluid flowing therethrough.

During the steady state mode of operation, the gas turbine assembly 100 may be utilized to consume one or more VOCs from a waste stream 170. For example, the gas turbine assembly 100 may be configured to utilize the VOCs from the waste stream 170 as a supplemental fuel. In another example, the gas turbine assembly 100 may be configured to destroy or oxidize the gas turbine assembly 100 to reduce a concentration of the VOCs from the waste stream 170. In at least one embodiment, illustrated in FIG. 1, the waste stream 170 may be fluidly coupled with line 168 downstream from the filter 116 and configured to direct the VOCs thereto. In another embodiment, the waste stream 170 may be fluidly coupled with line 166 upstream of the filter 116. In yet another embodiment, the waste stream 170 containing the VOCs may be fluidly coupled with the warmer 130 and/or the fuel injection point 146 and configured to direct the VOCs thereto.

During the shutdown mode of operation, the main fuel valve 152 may be actuated to the closed position to thereby prevent the fuel from flowing from the main fuel source 128 to the fuel injection point 146 and/or the oxidizer 104. While preventing the fuel from flowing to the oxidizer 104 may prevent the generation of additional heat or thermal energy, the oxidizer 104 may be maintained at a relatively high temperature for an extended period of time. For example, as previously discussed, the reaction chamber 124 of the oxidizer 104 may contain a material configured to retain heat to sustain the oxidation process. Accordingly, as the main fuel valve 152 is actuated to the closed position, the oxidizer 104 may maintain the relatively high temperature (e.g., between about 700° C. to about 1350° C.) for an extended period of time. For example, the period of time in which the oxidizer 104 may maintain the relatively high temperature (e.g., between about 700° C. to about 1350° C.) after the main fuel valve 152 is closed may be at least 1 hour, at least 2 hours, at least 3 hours, at least 5 hours, at least 10 hours, at least 15 hours, at least 20 hours, at least 24 hours, or more. It should be appreciated that the period of time in which the oxidizer 104 may maintain the relatively high temperature without the fuel is substantially longer than a conventional combustor.

During the shutdown process, the respective speeds of the compressor 102 and the turbine 106 may be slowed to a resting state (e.g., no rotation). As the compressor 102 and the turbine 106 are slowed to the resting state, the blow-off valve 138 may be actuated to an opened position to vent or exhaust the heated process fluid flowing upstream from the oxidizer 104 toward the compressor 102. The actuation of the blow-off valve 138 may also depressurize the oxidizer 104. Venting the heated process fluid flowing upstream from the oxidizer 104 to the compressor 102 during the shutdown mode of operation may prevent the heated process fluid from damaging the compressor 102, the filter 116, and/or one or more components thereof. Before, during, or after the compressor 102 and the turbine 106 reach the resting state, the check valve 134 may be actuated from the opened position to the closed position to thereby prevent the heated process fluid from damaging the compressor 102, the filter 116, and/or one or more components thereof. While the compressor 102 and the turbine 106 are at the resting state, a flow of air may be drawn into or exhausted out of the blow-off line 150 via the blow-off valve 138. For example, the heated process fluid contained in the gas turbine assembly 100 may be exhausted from the oxidizer 104 via the blow-off line 150 and the blow-off valve 138. In another example, a cooled working fluid (e.g., atmospheric air) may be drafted into the gas turbine assembly 100 via the blow-off line 150. The cooled working fluid may be drafted from the blow-off line 150 through the oxidizer 104 and/or the turbine 106 to thereby exhaust the heated process fluid contained therein.

During one or more modes (e.g., failure event) of operating the gas turbine assembly 100, the check valve 134 and/or the bleed valve 136 may be utilized to prevent damage to the compressor 102 and/or the filter 116. For example, during one or more modes of operating the gas turbine assembly 100, a pressure ratio of the gas turbine assembly 100 may reach or exceed an operating pressure ratio limit of the compressor 102, resulting in a compressor surge event. During the compressor surge event, the backpressure generated in line 140 and/or line 142 may result in a flow of the heated process fluid from the oxidizer 104 toward the compressor 102. The backpressure and/or the flow of heated process fluid from the oxidizer 104 toward the compressor 102 may actuate the check valve 134 to the closed position to prevent the heated process fluid from damaging the compressor 102 and/or the filter 116. The check valve 134 may also be actuated to the closed position to prevent unreacted or unoxidized fuel downstream of the check valve 134 from flowing toward the compressor 102.

During the compressor surge event, a backpressure may also be generated in cooling line 156, thereby resulting in a flow of a heated process fluid from the casing of the turbine 106 toward the compressor 102. For example, as previously discussed, at least a portion of the compressed process fluid from the compressor 102 may be directed to the turbine 106 via cooling line 156, and the portion of the compressed process fluid directed to the turbine 106 may be heated by the oxidation product expanded through the turbine 106. During the compressor surge event, the heated process fluid in the turbine 106 may flow upstream to the compressor 102 via cooling line 156, thereby resulting in damage to the compressor 102 and/or the filter 116. In at least one embodiment, the bleed valve 136 may be actuated to the opened position to vent the heated process fluid from cooling line 156 during the compressor surge event to thereby prevent the heated process fluid from damaging the compressor 102 and/or the filter 116.

During one or more modes of operating the gas turbine assembly 100, the check valve 134 and the blow-off valve 138 may be utilized in conjunction to prevent a compressor surge event or subsequent surge events. For example, when a failure event (e.g., sensor malfunction, generator failure, over-speed, etc.) is detected, the gas turbine assembly 100 may be operated in an emergency shutdown mode of operation. During the emergency shutdown mode of operation, the blow-off valve 138 may be actuated from the closed position to the opened position to vent the process fluid from line 140. Before or during the actuation of the blow-off valve 138 from the closed position to the opened position, the check valve 134 may be actuated to the closed position to prevent or shorten the compressor surge event.

Figure 2:
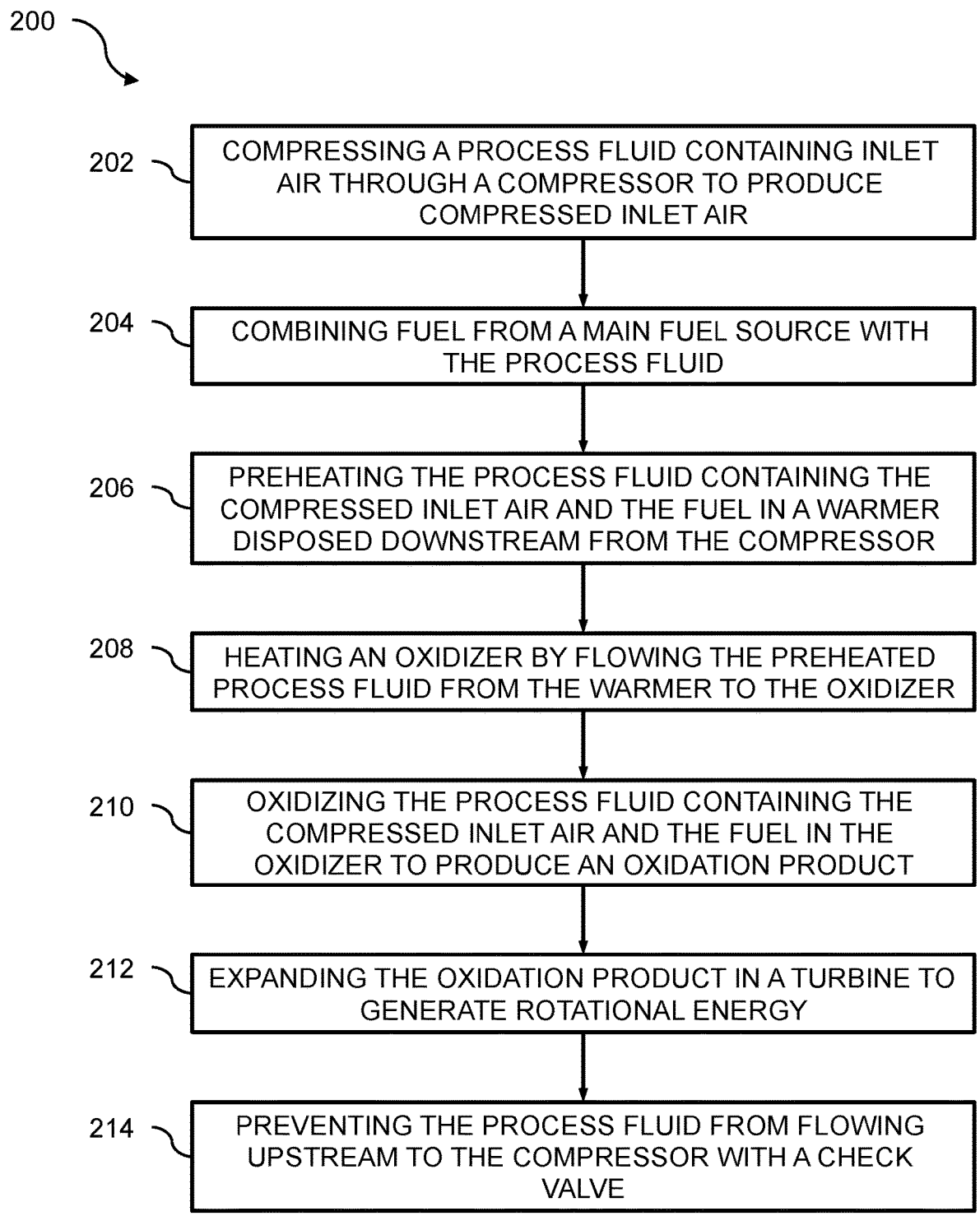
FIG. 2 illustrates a flowchart of a method for operating a gas turbine assembly, according to one or more embodiments disclosed.

FIG. 2 illustrates a flowchart of a method 200 for operating a gas turbine assembly, according to one or more embodiments. The method 200 may include compressing a process fluid containing inlet air through a compressor to produce compressed inlet air, as shown at 202. The method 200 may also include combining fuel from a main fuel source with the process fluid, as shown at 204. The method 200 may further include preheating the process fluid containing the compressed inlet air and the fuel in a warmer disposed downstream from the compressor, as shown at 206. The method 200 may also include heating an oxidizer by flowing the preheated process fluid from the warmer to the oxidizer, as shown at 208. The method 200 may also include oxidizing the process fluid containing the compressed inlet air and the fuel in the oxidizer to produce an oxidation product, as shown at 210. The method 200 may further include expanding the oxidation product in a turbine to generate rotational energy, as shown at 212. The method 200 may also include preventing the process fluid from flowing upstream to the compressor with a check valve, as shown at 214.

Figure 3:
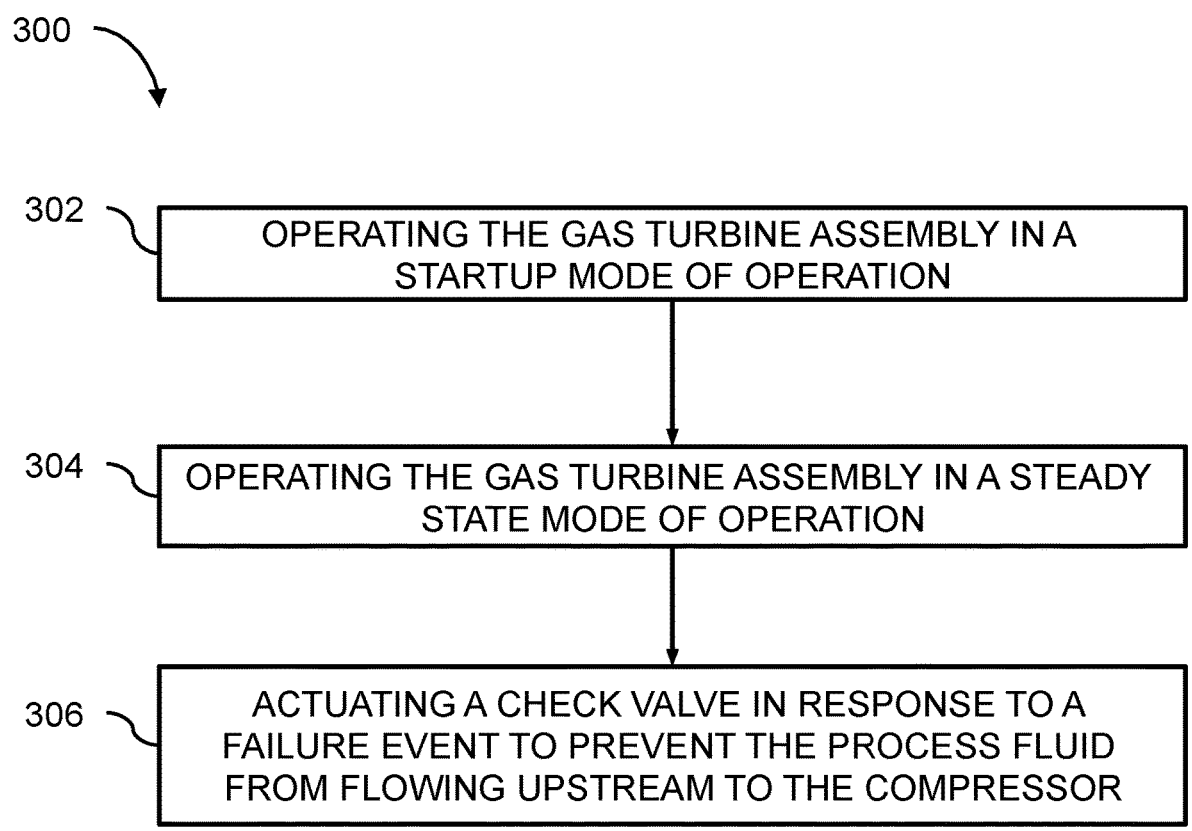
FIG. 3 illustrates a flowchart of another method for operating a gas turbine assembly, according to one or more embodiments disclosed.

FIG. 3 illustrates a flowchart of another method 300 for operating a gas turbine assembly, according to one or more embodiments. The method 300 may include operating the gas turbine assembly in a startup mode of operation, as shown at 302. Operating the gas turbine assembly in the startup mode of operation may include compressing a process fluid containing inlet air through a compressor to produce compressed inlet air. Operating the gas turbine assembly in the startup mode of operation may also include preheating the process fluid containing the compressed inlet air in a warmer disposed downstream from the compressor. Operating the gas turbine assembly in the startup mode of operation may further include preheating an oxidizer to an auto-ignition temperature of the process fluid by flowing the preheated process fluid from the warmer to the oxidizer. The method 300 may also include operating the gas turbine assembly in a steady state mode of operation, as shown at 304. Operating the gas turbine assembly in the steady state mode of operation may include ceasing the preheating of the process fluid in the warmer. Operating the gas turbine assembly in the steady state mode of operation may also include flowing fuel from a main fuel source to a fuel injection point to combine the fuel with the process fluid. Operating the gas turbine assembly in the steady state mode of operation may further include oxidizing the process fluid containing the compressed inlet air and the fuel in the oxidizer to produce an oxidation product. Operating the gas turbine assembly in the steady state mode of operation may also include expanding the oxidation product in a turbine to generate rotational energy. Operating the gas turbine assembly in the steady state mode of operation may also include actuating a check valve to prevent the process fluid from flowing upstream to the compressor. The method 300 may also include actuating a check valve in response to a failure event to prevent the process fluid from flowing upstream to the compressor, as shown at 306.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

We claim:
1. A method for operating a gas turbine assembly, comprising:
   operating the gas turbine assembly in a startup mode of operation, comprising:
   compressing a process fluid containing inlet air through a compressor to produce compressed inlet air;
   preheating the process fluid containing the compressed inlet air in a warmer disposed downstream from the compressor; and
   preheating an oxidizer to an auto-ignition temperature of the process fluid by flowing the preheated process fluid from the warmer to the oxidizer; and
   operating the gas turbine assembly in a steady state mode of operation, comprising:
   ceasing the preheating of the process fluid in the warmer;
   flowing fuel from a main fuel source to a fuel injection point to combine the fuel with the process fluid;
   oxidizing the process fluid containing the compressed inlet air and the fuel in the oxidizer to produce an oxidation product;
   expanding the oxidation product in a turbine to generate rotational energy; and
   actuating a check valve in response to a failure event to prevent the process fluid from flowing upstream to the compressor.

2. The method of claim 1, wherein operating the gas turbine assembly in the startup mode of operation further comprises actuating a bleed valve to an opened position to vent at least a portion of the process fluid from the compressor.

3. The method of claim 2, wherein operating the gas turbine assembly in the startup mode of operation further comprises activating the check valve, wherein activating the check valve comprises:
   actuating the bleed valve from the opened position to a closed position to pressurize process fluid from the compressor upstream of the check valve; and
   actuating the check valve to an opened position in response to the pressurized process fluid from the compressor upstream of the check valve.

4. The method of claim 1, further comprising operating the gas turbine assembly in a shutdown mode of operation, comprising:
   preventing the flow of the fuel from the main fuel source to the fuel injection point; and venting at least a portion of the process fluid upstream of the oxidizer through a blow-off line by actuating a blow-off valve to an opened position.

5. The method of claim 4, wherein operating the gas turbine assembly in the shutdown mode of operation further comprises actuating the check valve to a closed position before actuating the blow-off valve to the opened position.

6. The method of claim 4, wherein operating the gas turbine assembly in the steady state mode of operation further comprises cooling the turbine by flowing at least a portion of the process fluid from the compressor to the turbine via a cooling line.

7. The method of claim 6, wherein operating the gas turbine assembly in the shutdown mode of operation further comprises actuating a bleed valve to an opened position to vent the process fluid from the cooling line.

8. The method of claim 1, wherein operating the gas turbine assembly in the steady state mode of operation further comprises converting the rotational energy to electrical power in a generator operatively coupled with the turbine.

9. The method of claim 8, wherein operating the gas turbine assembly in the steady state mode of operation further comprises exhausting the expanded oxidation product from the turbine.

10. A gas turbine assembly, comprising:
a compressor configured to receive and compress inlet air to produce compressed inlet air;
a warmer fluidly coupled with and disposed downstream from the compressor, the warmer being configured to receive and preheat the compressed inlet air from the compressor and a fuel from a main fuel source;
an oxidizer fluidly coupled with and disposed downstream from the warmer, the oxidizer being configured to oxidize the compressed inlet air and the fuel in a flameless oxidation process to produce an oxidation product;
a turbine fluidly coupled with and disposed downstream from the oxidizer, the turbine being configured to receive and expand the oxidation product from the oxidizer to generate rotational energy;
a generator operatively coupled with the turbine and configured to convert the rotational energy to electrical energy;
a check valve fluidly coupled with and disposed between the compressor and the warmer, the check valve being configured to prevent the oxidation product from flowing to the compressor;
a bleed line fluidly coupled with and disposed between the compressor and the check valve;
a bleed valve fluidly coupled with the bleed line;
a blow-off line fluidly coupled with and disposed between the check valve and the warmer; and
a blow-off valve fluidly coupled with the blow-off line.

* * * * *